United States Patent
Williams et al.

(10) Patent No.: US 6,313,972 B1
(45) Date of Patent: Nov. 6, 2001

(54) FLEX CIRCUIT FLEXURE WITH INTEGRAL HIGH COMPLIANCE GIMBAL

(75) Inventors: Stephen P. Williams, Morgan Hill; Timothy A. Riener, Fremont, both of CA (US)

(73) Assignee: Maxtor Corporation, Longmont, CO (US)

(*) Notice: Subject to any disclaimer, the term of this patent is extended or adjusted under 35 U.S.C. 154(b) by 992 days.

(21) Appl. No.: 08/567,403

(22) Filed: Dec. 5, 1995

Related U.S. Application Data

(63) Continuation-in-part of application No. 08/446,127, filed on May 22, 1995, now abandoned.

(51) Int. Cl.[7] .................................................. G11B 5/54
(52) U.S. Cl. .................................................. 360/245.3
(58) Field of Search .................................. 360/103–104, 360/107–108, 245.3

(56) References Cited

U.S. PATENT DOCUMENTS

| | | | |
|---|---|---|---|
| 4,616,279 | 10/1986 | Poorman | 360/103 |
| 4,645,280 | 2/1987 | Gordon et al. | 339/17 |
| 4,670,804 | 6/1987 | Kant et al. | 360/102 |
| 4,789,914 | 12/1988 | Ainslie et al. | 360/103 |
| 4,819,094 | 4/1989 | Oberg | 360/104 |
| 4,991,045 | 2/1991 | Oberg | 360/104 |
| 4,996,623 | 2/1991 | Erpelding et al. | 360/104 |
| 5,001,583 | 3/1991 | Matsuzaki | 360/104 |
| 5,006,946 | 4/1991 | Matsuzaki | 360/104 |
| 5,055,969 | 10/1991 | Putnam | 361/398 |
| 5,391,842 | 2/1995 | Bennin et al. | 174/260 |
| 5,491,597 | * 2/1996 | Bennin et al. | 360/104 |
| 5,519,552 | * 5/1996 | Kohira et al. | 360/104 |

OTHER PUBLICATIONS

Ohwe, et al., "Development of Integrated Suspension System for a Nanoslider with an MR Head Transducer," IEEE Transactions on Magnetics, 93S09.00 1993, pp. 3924–3926, U.S.A.

* cited by examiner

Primary Examiner—George J. Letscher
(74) Attorney, Agent, or Firm—Debra A. Chun

(57) ABSTRACT

An improved flexure for supporting a read/write head adjacent to a relatively moving storage medium in a disk drive is disclosed. The flexure is a patterned flex circuit structure that is mounted to a load beam in an actuator assembly and includes integral wiring and bonding pads for electrically connecting the head to the electronics of the disk drive. The flexure also implements a high compliance gimbal with integral wiring.

11 Claims, 7 Drawing Sheets

FLEX CIRCUIT FLEXURE WITH INTEGRAL HIGH COMPLIANCE GIMBAL

REFERENCE TO RELATED APPLICATION

This is a continuation-in-part of U.S. patent application Ser. No. 08/446,127 filed on May 22, 1995, now abandoned.

FIELD OF THE INVENTION

This invention relates generally to a flexure for supporting a read/write head adjacent to a relatively moving recording medium in a disk drive. More particularly, it relates to a flex circuit flexure with integral conductors and bonding pads that implements a high compliance gimbal for attaching and supporting a high performance, low-mass head at the end of a load beam.

BACKGROUND

With the advent of more powerful central processor units (CPU's) and higher bandwidth bus structures, disk drive performance has become a significant limiting factor in overall computer system performance. Specifically, disk drives tend to impose data access delays on the order of several milliseconds, as opposed to the nanoseconds required to access data from electronic storage, hence there is a need to reduce actuator access times in order to enable more rapid retrieval of data from the tracks of a recording surface in a disk drive.

Contemporary disk drives typically include a rotating rigid storage disk and a head positioner for positioning a data transducer at different radial locations relative to the axis of rotation of the disk, thereby defining numerous concentric data storage tracks on each recording surface of the disk. The head positioner is typically referred to as an actuator. Although numerous actuator structures are known in the art, in-line rotary voice coil actuators are now most frequently employed due to their simplicity, high performance, and their ability to be mass balanced about their axis of rotation, the latter being important for making the actuator less sensitive to perturbations. A closed-loop servo system is employed to operate the actuator and thereby position the heads with respect to the disk surface. The dynamic characteristics of hard disk drive actuator servo systems are such that higher servo system performance may be achieved when the natural mechanical vibration modes of the head and suspension structures do not occur at or near the servo sampling frequency or its aliased variants.

The read/write transducer, which may be of a single or dual element design, is typically mounted upon a ceramic slider structure having an air bearing surface for supporting the transducer at a small distance away from the surface of the moving medium. Single element designs typically require two wire connections while dual element designs require four. Magnetoresistive (MR) heads, in particular, generally require four wires. The combination of an air bearing slider and a read/write transducer is also known as a read/write head or a recording head.

Sliders are generally mounted to a gimbaled flexure structure attached to the distal end of a suspension's load beam structure. A spring biases the load beam, and therethrough the head, towards the disk, while the air pressure beneath the head pushes the head away from the disk. The equilibrium distance then determines the "flying height" of the head. By utilizing such an "air bearing" to support the head away from the disk surface, the head operates in a hydrodynamically lubricated regime at the head/disk interface rather than in a boundary lubricated regime. The air bearing maintains spacing between the transducer and the medium which reduces transducer efficiency, however, the avoidance of direct contact vastly improves the reliability and useful life of the head and disk components. Demand for increased areal densities may nonetheless require that heads be operated in pseudo contact or even boundary lubricated contact regimes, however.

The disk drive industry has been progressively decreasing the size and mass of the slider structures in order to reduce the moving mass of the actuator assembly and to permit closer operation of the transducer to the disk surface, the former giving rise to improved seek performance and the latter giving rise to improved transducer efficiency that can then be traded for additional track density. The size (and therefore mass) of a slider is usually characterized with reference to a so-called standard 100% slider (minislider). The terms 70%, 50%, and 30% slider (microslider, nanoslider, and picoslider, respectively) therefore refer to more recent low mass sliders that have linear dimensions that are scaled by the applicable percentage relative to the linear dimensions of a standard minislider.

Although smaller, low mass heads can provide both performance and economic advantages, the reductions in physical slider dimensions give rise to numerous problems that do not necessarily scale linearly with the dimensional changes. If, for example, the size and load force on the slider are simply halved, the air bearing stiffness in the pitch direction will be reduced on the order of $\frac{1}{8}$. A flexure must have sufficient compliance to allow the slider adequate freedom to pitch and roll in order to maintain the trailing edge of the slider at the desired distance from the moving media surface because the failure to maintain adequate spacing can lead to signal modulation, data loss, or even catastrophic failure of the head or disk components. Accordingly, flexures designed for use with picosliders must have highly compliant gimbals, which are typically implemented by the flexure structure.

Even assuming a highly compliant gimbal structure, however, a significant additional problem arises in that the wiring that interconnects the disk drive electronics to the transducer(s) on the slider contributes a nontrivial degree of parasitic stiffness to the gimbal structure, particularly when using dual element heads, which generally require 4 discrete wires.

Finally, the requisite wire structure adds mass to the overall head/gimbal assembly (HGA). The current wire gauges employed with picosliders are about as small as can be practically and reliably manufactured and assembled. The mass of common prior art wires, including an insulating tube, can even exceed the entire mass of certain thin film fabricated HGA's designed for use in contact or pseudo-contact recording applications. Thus in current advanced HGA designs, a semi-tubeless wire design is employed wherein the dielectric tube does not extend along the length of the load beam. Although this reduces the mass of the HGA, it does create additional reliability problems because of the inherent fragility of long unprotected runs of small wires and because of the increased potential for shorting the wires to the each other or to the load beam. Accordingly, there exists a need for a more robust wiring structure for an HGA that does not deleteriously affect either gimbal compliance or HGA mass.

Prior art attempts to address these problems include fully integrated head/flexure/suspension structures that are fabricated via conventional photolithographic materials deposition and patterning techniques, laminated stainless steel suspensions structures which utilize the beam and gimbal structures as conductors, and stainless steel suspensions having deposited insulators and conductors. Although photolithographically deposited suspensions can be particularly low in mass, the mechanical properties of the deposited beams have not proven suitable for high performance servo operation, while the deposited gimbal structures have been relatively fragile. Laminated stainless steel suspensions appear to have better mechanical performance than deposited suspensions, however, the laminated stainless steel designs have higher parasitic capacitances than prior art designs and are relatively difficult to manufacture with repeatable precision. Additionally, because the stainless steel used in the gimbal structure is relatively stiff, the mechanical alterations required to achieve high compliance result in a gimbal structure that is also relatively fragile and difficult to manufacture. Deposited conductor stainless steel suspensions are easier to fabricate but have similar problems with respect to the robustness and manufacturability of the gimbal structure.

Referring to the drawings, wherein like characters designate like or corresponding parts throughout the views, FIG. 1 shows an head/gimbal assembly (HGA) 2 in accordance with the prior art. The HGA includes load beam 14 which is attached to a baseplate 4 which is in turn mounted to an actuator arm (not shown).

An inline rotary voice coil actuator structure (not shown) typically includes a plurality of actuator arms that are vertically registered to accommodate a plurality of HGA's (not shown). The actuator structure is used to move and position read/write heads at different radial positions relative to the rotational axis of a rotating disk stack (not shown), as is well known in the art.

The prior art HGA 2 also includes a flexure 18 which is fixed to the load beam 14 and which implements a gimbal 12 which permits limited relative motion of read/write head 16, which is mounted to flexure 18. A twisted pair of lead wires 28 are mechanically and electrically connected to head 16 and extend along the length of the load beam 14. The lead wires are typically encased by a dielectric tube 29 to ensure that the wires are not shorted by tabs 19, which are used to hold the wires generally fixed with respect to load beam 14. The overall mass of the wires and dielectric tube can be up to a milligram or more. More recent prior art HGA designs may employ semi tubeless wiring configurations which can result in relatively low HGA masses.

FIG. 2 shows a side view of prior art HGA 2. A portion of the HGA may optionally be prebent so that during operation, HGA 2 remains relatively straight while still applying a load force on head 16 in the direction of the disk surface (not shown), thereby reducing the z-axis (height) clearance required for the in situ HGA structure.

FIGS. 3 and 4 are respective enlarged bottom and side views of the distal portion of HGA 2 showing the prior art flexure and wire structure in greater detail. Flexure 18 is attached to the distal end of load beam 14 and implements a gimbal for interconnecting and pivotably supporting head 16 relative to the load beam. The head has a generally planar undersurface 20 which includes a pair of air bearing rails 22 which form the main air bearing surface (ABS). Each of the rails includes a taper 24 at the leading edge. The trailing edge of at least one of the rails 22 includes a read/write transducer 26. A twisted pair of fine wires 28 (two pairs for a high performance, dual element MR design) are provided to interconnect the transducer to a preamplifier circuit (not shown) or other electronic component which is typically mounted away from the HGA structure.

The invention to be described provides a robust, flexure with integral wiring and a high compliance gimbal for use with a low mass head supported on a suspension attached to an actuator in a high performance rigid disk drive.

SUMMARY OF THE INVENTION

A flex circuit in accordance with this invention includes a flexure having integral conductive wiring. The flex circuit replaces a prior art flexure at the distal end of a suspension load beam and may optionally replace a prior art conductor and insulator structure along the length of a load beam to achieve an improved, low-mass HGA (i.e., overall HGA mass comparable to a prior art design employing an advanced semi-tubeless wiring design) having a high compliance gimbal structure. This invention shows substantial performance and manufacturing advantages over prior art HGA designs. While the gimbal compliance of the flexure is significantly increased relative to prior art flexure designs, surprisingly, the resonant mode performance of the resultant HGA is not deleteriously affected.

A general object of the present invention is to provide a low-profile, robust, highly compliant flexure and wiring structure for mechanically connecting a low mass read/write head to a load beam mounted to an actuator assembly in a disk drive and for electrically connecting the read/write head to electronic componentry within the disk drive which overcomes limitations and drawbacks of the prior art.

A more specific object of the present invention is to provide a flexure and wiring structure for supporting subminiature sliders on a suspension in an inline rotary actuator that exhibits improved gimbal compliance relative to prior art flexure and wiring structures without materially affecting resonant mode performance.

Yet another object of the present invention is to provide an improved method for manufacturing and assembling low mass head/gimbal assemblies (HGA's).

An additional object of the present invention is to provide an in-line, mass balanced, rotary voice coil actuator assembly which includes a low mass HGA having a high compliance gimbal which is capable of providing improved seek performance.

These and other objects, advantages, aspects, and features of the present invention will be more fully appreciated and understood upon consideration of the following detailed descriptions of a preferred embodiment presented in conjunction with the accompanying drawings.

BRIEF DESCRIPTION OF THE DRAWINGS

In the Drawings:

FIG. 12b is a plan view of a stainless steel stiffener panel bonded to the sheet of partially formed flex circuit flexures shown in FIG. 12a.

DETAILED DESCRIPTION OF A PREFERRED EMBODIMENT

Figure 1:
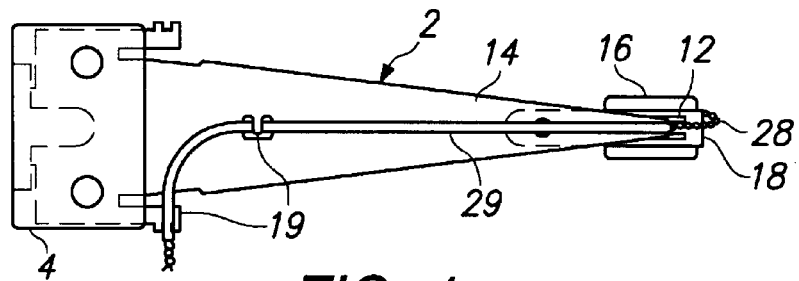
FIG. 1 is an HGA including a flexure according to the prior art for a magnetic disk drive system.
Figure 2:
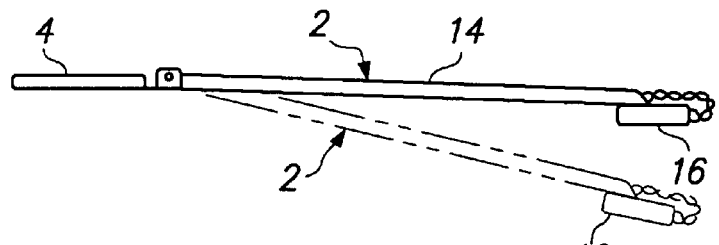
FIG. 2 is a side view of the prior art HGA shown in FIG. 1.
Figure 3:
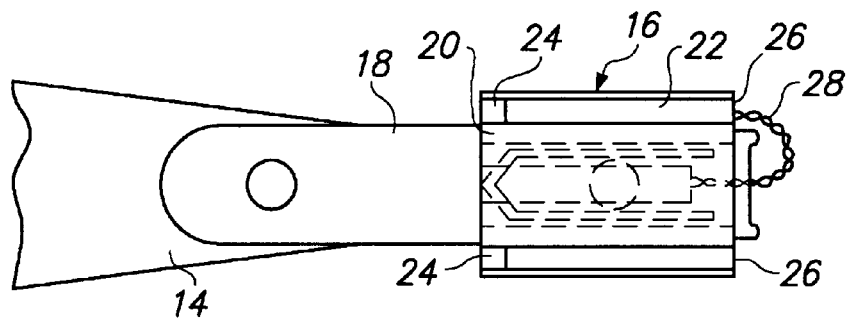
FIG. 3 is an enlarged bottom view of the slider, flexure and distal part of the load beam of the prior art HGA shown in FIG. 1.
Figure 4:
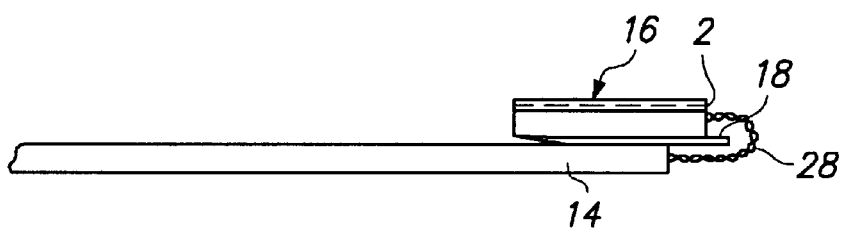
FIG. 4 is an enlarged side view of the slider, flexure and distal part of the load beam of the prior art HGA shown in FIG. 1.
Figure 5:
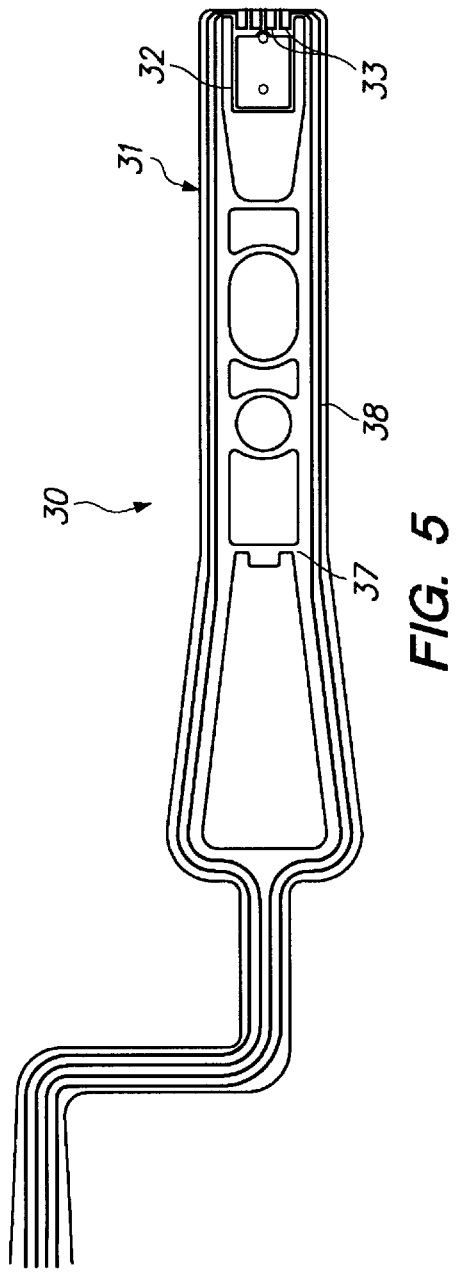
FIG. 5 is a bottom view of flex circuit in accordance with a preferred embodiment of the present invention which includes embedded conductor structure and which implements a high compliance gimbal.

Turning now to FIG. 5, a flex circuit 30 in accordance with a preferred embodiment of the present invention includes a base film 37 which includes embedded (i.e., introduced as an integral part but not necessarily fully enclosed) conductor structure 38 and which includes a flexure 31 that implements a high compliance gimbal at the distal end of flex circuit 30 that permits the head mounting region, gimbal tongue 32, to pitch and roll. Those skilled in the art will recognize that alternative gimbal geometries may be employed (e.g., flexure 31 may implement a simplified gimbal consisting merely of a gimbal tongue 32, due to the inherent out-of-plane flexibility of the flex circuit material), however, the illustrated gimbal geometry is presently preferred. Gimbal tongue 32 includes bonding pads 33 for electrically interconnecting the read/write transducer(s) (not shown) to the flex circuit conductor structure 38.

Flex circuit 30 may be fabricated via well known prior art techniques for fabricating flex circuits. The presently preferred base film material is polyetherimide or polyimide (a particularly useful such base film material is known as KAPTON™) while the presently preferred conductor material is copper. An extremely thin intermediate layer (not shown) of polyamide or other insulator material may interpose the conductor and the base film. Preferably, the flex circuits are fabricated en mass on a sheet for manufacturing economy and for ease of handling. The final outline outline of the flex circuit may be defined via cutting, etching, or laser ablation methods, the latter two being capable of extremely high precision. In a preferred embodiment of the present invention, flex circuit 30 is fabricated to an overall thickness of about 0.05 mm and has an outline generally registered with the outline of the load beam 42 (shown in FIG. 6) to which it is ultimately attached. The overall mass of flex circuit 30 is only about 0.01 micrograms.

It should be noted that electronic componentry may optionally be fabricated on flex circuit 30, if desired. In particular, a preamplifier integrated circuit (IC) chip (not shown) may be attached to a portion of flex circuit 30 for connection to the transducer(s). The IC die can be attached directly to flex circuit 30 and wire bonded to conductor structure 38; the mounted IC die can then be encapsulated in epoxy or the like to minimize the attendant mass increases (this eliminates the traditional IC packaging mass). Additionally, or in the alternative, thick film resistors and capacitors may be fabricated on flex circuit 30 to act as trim circuits for the individual read/write transducer(s). Since, in accordance with the present invention, the heads may easily (optionally) be mounted and electrically interconnected to gimbal tongue 32 on the flex circuit prior to assembly of the flex circuit to the load beam, the testing and tuning of individual transducers on the heads prior to final assembly is facilitated.

Figure 6:
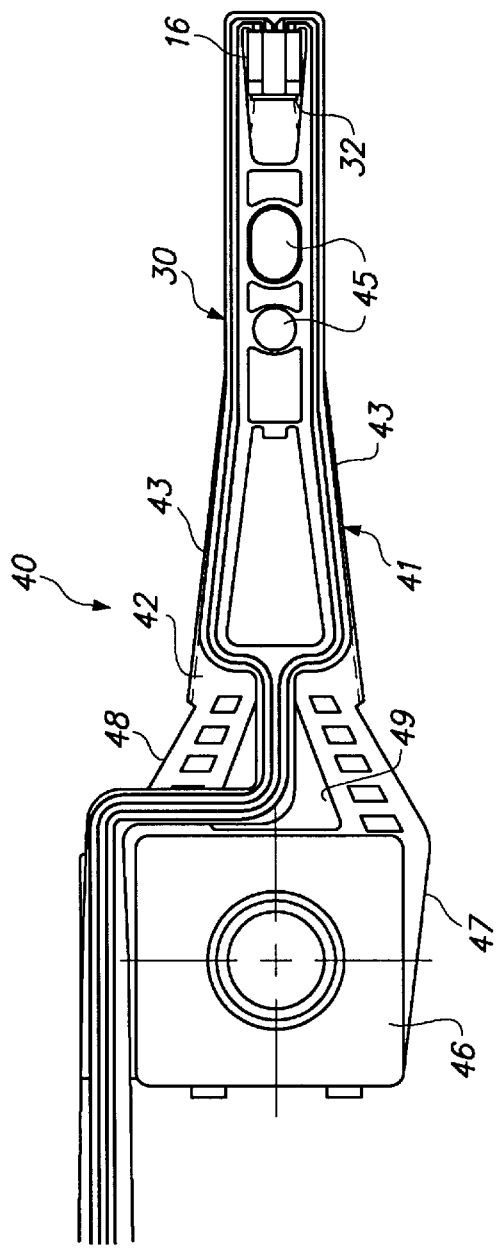
FIG. 6 is bottom view of a preferred embodiment of an HGA incorporating the flex circuit of FIG. 5.

FIG. 6 shows a bottom view of a fully assembled HGA 40 in accordance with the preferred embodiment of the present invention. Flex circuit 30 may be bonded to load beam 42, using a thin (e.g., on the order of 0.002 inches or less) adhesive bonding film, for example, to complete the formation of suspension 41 (a term of art referring to an HGA less the head and wires). A preferred bonding film is Rogers Corporation product #8970, Which is a high modulus thermosetting phenolic butyral adhesive system which exhibits excellent electrical properties and good chemical resistance and which exhibits good adhesion to a variety of substrate. Alternatively, polyester copolymer adhesives, acrylic pressure sensitive adhesives or other adhesives may be used, however alignment typically is more problematic with the letter two alternatives.

Suspension 41 is an upswept rail configuration specifically designed for supporting a 30-percent picoslider head 16. Suspension 41 has an overall length (in the longitudinal direction) of about 20–30 millimeters and a transverse width on the order of about 6.0 millimeters at the widest region of the suspension. The proximal end of load beam 42 has a width of about 3.2 mm (exclusive of rails 43) and narrows towards the distal end. A lateral side of the load beam 42, in the illustrated embodiment, forms an angle of less than about 10 degrees and preferably about 6 degrees with respect to the central longitudinal axis of the load beam. Picoslider head 16 may be adhesively or otherwise rigidly attached, using well known attachment techniques, to gimbal tongue 32. Head 16 may be electrically interconnected during attachment to gimbal tongue 32 or alternatively, the electrical interconnection may be performed after head 16 is attached to gimbal tongue 32, thereby completing the formation of HGA 40 (details of the electrical interconnection are discussed hereinafter with respect to FIG. 8).

HGA 40 includes a baseplate 46 conventionally attached to mounting section 47 of suspension 41 (at the cantilevered end). Baseplate 46 is ultimately used for rigidly mounting suspension 41 to an actuator arm (not shown); typically, the baseplate is swaged onto the actuator arm. Spring section 48, which is fixed to mounting section 47, interconnects mounting section 47 with load beam 42. Spring section 48 may define one or more central voids 49 for adjusting the spring constant of spring section 48. The thickness of spring section 48 may also be varied to adjust the spring constant. Suspension 41 has a small tooling holes 45 which are used to facilitate accurate fabrication and assembly of suspension 41.

Figure 13:
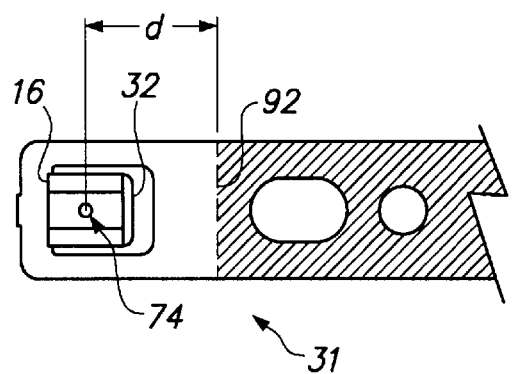
FIG. 13 is a diagrammatic plan view of the distal end of flexure of the HGA of FIG. 6 illustrating the distance of the bond line relative to the load button center.
Figure 14A:
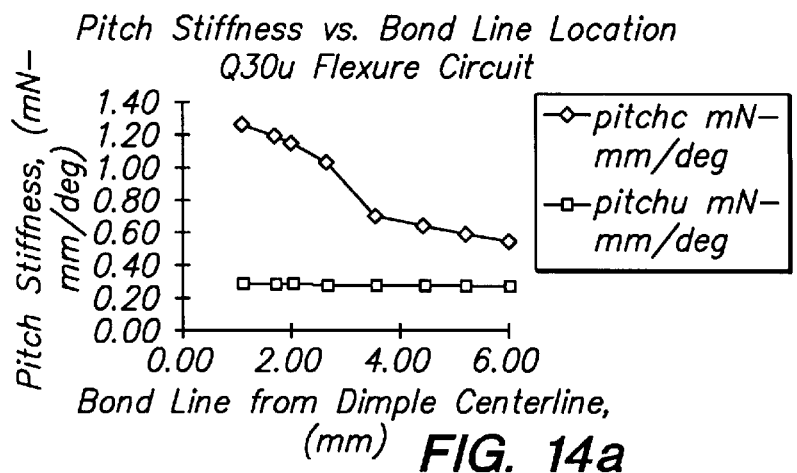
FIG. 14a is a graph illustrating pitch stiffness vs. distance from the bond line to the load button center.
Figure 14B:
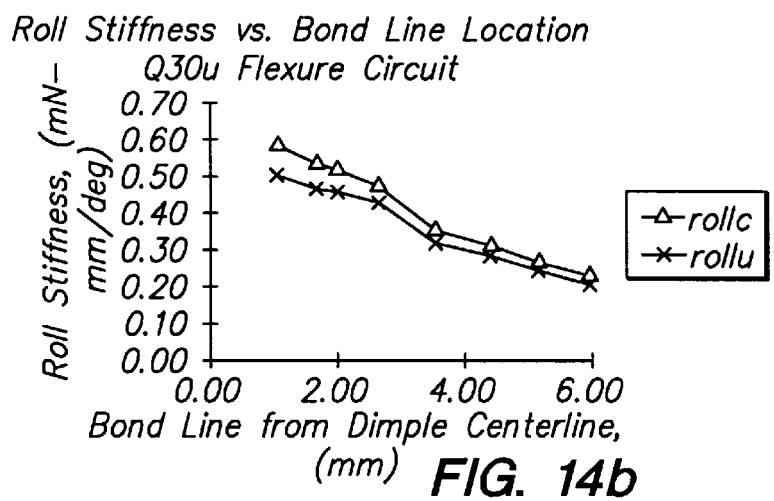
FIG. 14b is a graph illustrating roll stiffness vs. distance from the bond line to the load button center.
Figure 14C:
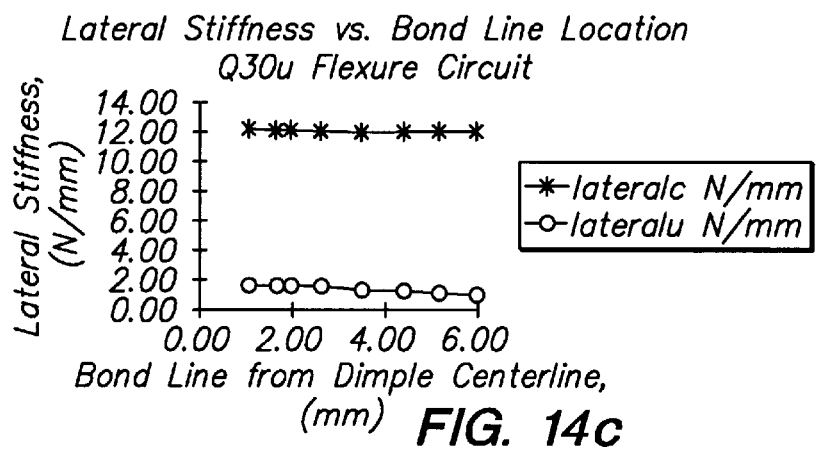
FIG. 14c is a graph illustrating lateral stiffness vs. distance from the bond line to the load button center.

Turning now to FIG. 13, the distance d from the center of pivot dimple 74 (shown more clearly in FIG. 11) to bond line 92, which forms a boundary between the region of flexure 31 that is bonded (hatched) to load beam 42 (omitted for clarity) and the region of flexure 31 that is unbonded, appears to have a significant and surprising effect upon the gimbal compliance. FIGS. 14a and 14b show that the pitch and roll stiffnesses of the gimbal drop dramatically when d is between about 2.5 to 3.5-mm. FIG. 14c shows that the lateral stiffness is not adversely affected, however. Thus, in the preferred embodiment of the present invention, the bond line is set so that d is equal to about 4-mm, to provide significantly improved pitch and roll compliance without adversely affecting lateral stiffness.

Figures 7, 8:
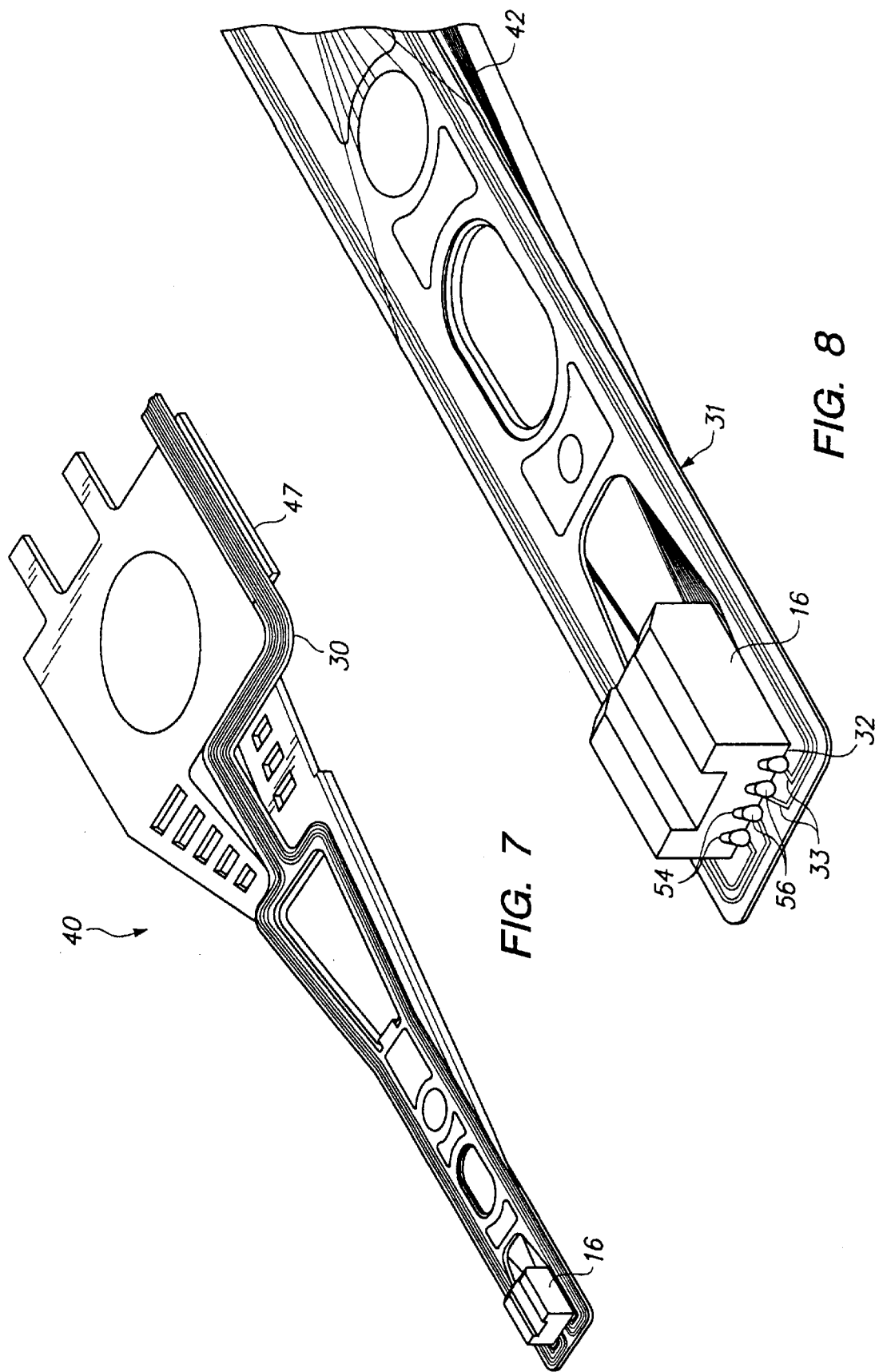
FIG. 7 is a diagrammatic, isometric view of the HGA of FIG. 6.
FIG. 8 is an enlarged, diagrammatic isometric view of the distal end of the HGA of FIG. 6.

FIG. 7 shows an isometric view of the HGA shown in FIG. 5 with the baseplate omitted so as not to obscure the flex circuit detail. It should be noted that although in this preferred embodiment of the present invention flex circuit 30 extends towards the actuator structure (not shown) past the suspension mounting section 47, flex circuit 30 may optionally be made shorter and terminated with a plurality of electrical bonding pads to provide alternative wiring options. In this preferred embodiment of the present invention, the extended flex circuit 30 provides an electrical connection to the supported transducer(s) (not shown) of head 16 without materially affecting either the performance of the gimbal or the spring section of suspension.

Turning now to FIG. 8, an enlarged isometric view of the distal end of the HGA illustrated in FIG. 8 shows the electrical interconnection between transducer bonding pads 54 on slider 16 and the electrical bonding pads 33 on flexure 31. Flexure 31 implements a gimbal which includes a gimbal tongue 32 for mechanically interconnecting and pivotably supporting head 16 relative to the load beam 42. In the illustrated embodiment, head 16 is mounted to flexure 31 prior to the electrical interconnection step. Conductive masses 56, which may be solder, conductive epoxy, spot welded gold, or the like, are used to electrically interconnect the transducer bonding pads 54 to the electrical bonding pads 33. Alternatively, conventional lead wires (not shown) may be soldered or otherwise electrically connected to the transducer bonding pads 54 and also electrically connected to the electrical bonding pads 33 on flexure 31 to electrically interconnect the head 16 to the conductor structure of flexure 31. Significantly, this alternative wiring scheme (not illustrated) would not affect the compliance of the gimbal because the lead wires from the head would be attached to a portion of the gimbal (i.e., gimbal tongue 32) that moves with the head. Such an improvement would be even more significant when employing HGA's utilizing advanced dual element transducers which require four lead wires. In yet another alternative embodiment (not illustrated), the slider may be fabricated with electrical bonding pads on the top surface. Corresponding electrical bonding pads may be fabricated on the gimbal tongue so that the slider may be electrically and mechanically interconnected to the gimbal in a single operation using solder, conductive epoxy, gold ball bonding or the like.

Figure 9:
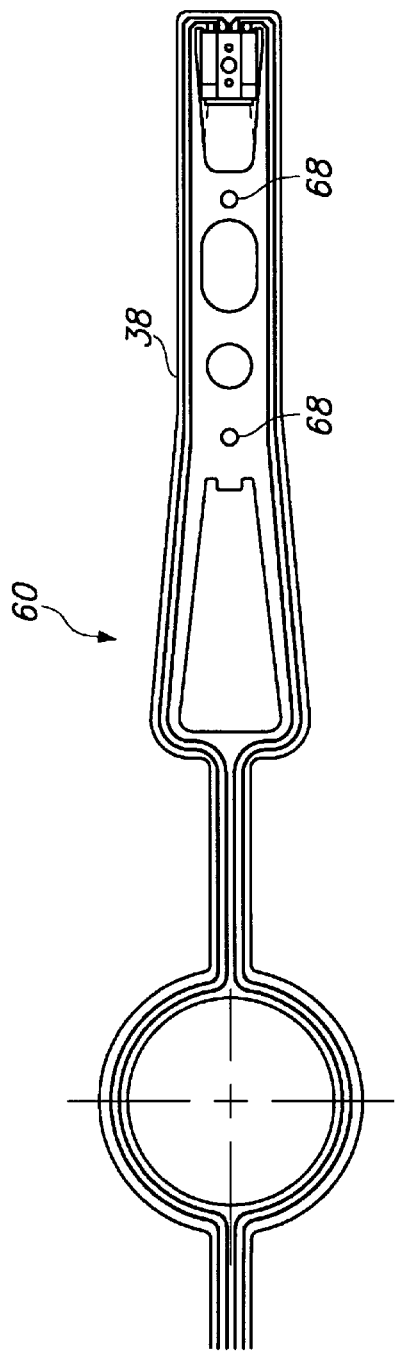
FIG. 9 is a bottom view of flex circuit in accordance with an alternative preferred embodiment of the present invention which includes embedded conductor and laser bonding pad structure and which implements a high compliance gimbal.
Figure 10:
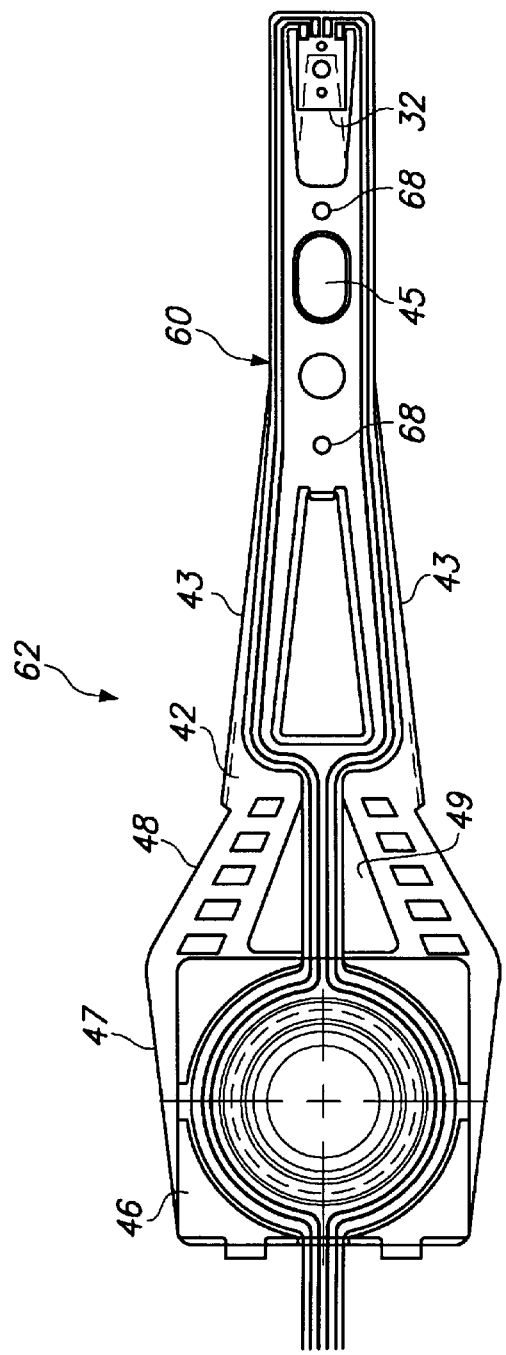
FIG. 10 is a bottom view of an alternative preferred embodiment of a suspension assembly incorporating the flex circuit of FIG. 9.

FIG. 9 discloses yet another alternative preferred embodiment of a flex circuit 60 in accordance with the present invention. In addition to geometry changes of the wire routing portion of flex circuit 60, this alternative preferred embodiment also includes a plurality of gold or copper laser bonding pads 68. Turning now to FIG. 10, a fully assembled suspension 62 in accordance with this alternative preferred embodiment of the present invention is disclosed. Rather than being adhesively bonded to load beam 42, the flex circuit 60 is registered to and held in contact with load beam 42 during suspension assembly. Laser or other spot welding techniques are then employed to permanently bond the laser bonding pads 68 of the flex circuit to the adjacent parts of load beam 42. The laser bonding pads 68 are typically electrically isolated relative to the conductive wiring structure 38 embedded in flex circuit 60, although the laser bonding pads 68 may optionally be employed to provide an electrical path to ground between the slider (not shown) and loadbeam 42 to reduce the static charge buildup on the slider structure, however, this grounding method may result in increased gimbal stiffness due to the additional ground conductor leads that must be routed through the flexible portions of the gimbal structure.

Figure 11:
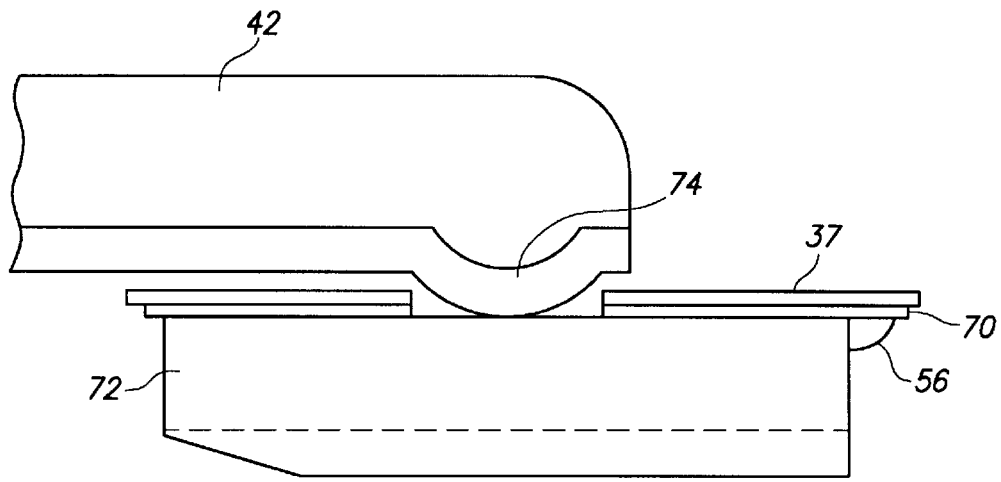
FIG. 11 is an enlarged diagrammatic side section view of the distal end of an HGA having an electrically grounded slider.

Because certain advanced transducers, such as MR read sensors, are particularly susceptible to failure from static discharge, the present invention provides an alternative means for grounding the slider body to load beam 42 to reduce static buildup in the slider. Turning to FIG. 11, a small hole is etched through the flex circuit base film 37 and copper ground layer 70; to expose to slider 72. A conductive mass 56 may optionally be used for the physical and electrical attachment of slider 72. The flex circuit is assembled to load beam 42 so that the pivot dimple 74 in the loadbeam passes through the etched hole to contact the top of slider 72. During operation, the spring preload (gram load) on load beam 42 causes pivot dimple 74 to maintain intimate mechanical and electrical contact with slider 72, thereby grounding the slider body to the load beam without requiring ground traces.

This grounding configuration reduces the HGA height by about 7% which facilitates improved disk-to-disk spacing. Significantly, by avoiding "point-contact" between the pivot dimple 74 (also known as a "load button") and the flex circuit itself, damage and deformation (both plastic and elastic) of the relatively soft flex circuit structure are avoided, which improves both the absolute performance and the repeatability of performance of the resultant HGA structure (e.g., by avoiding deformation of the relatively soft copper and/or dielectric layers at the load button/slider interface, changes in the static attitude bias of the head and hysteresis can be minimized or avoided).

Figure 12A:
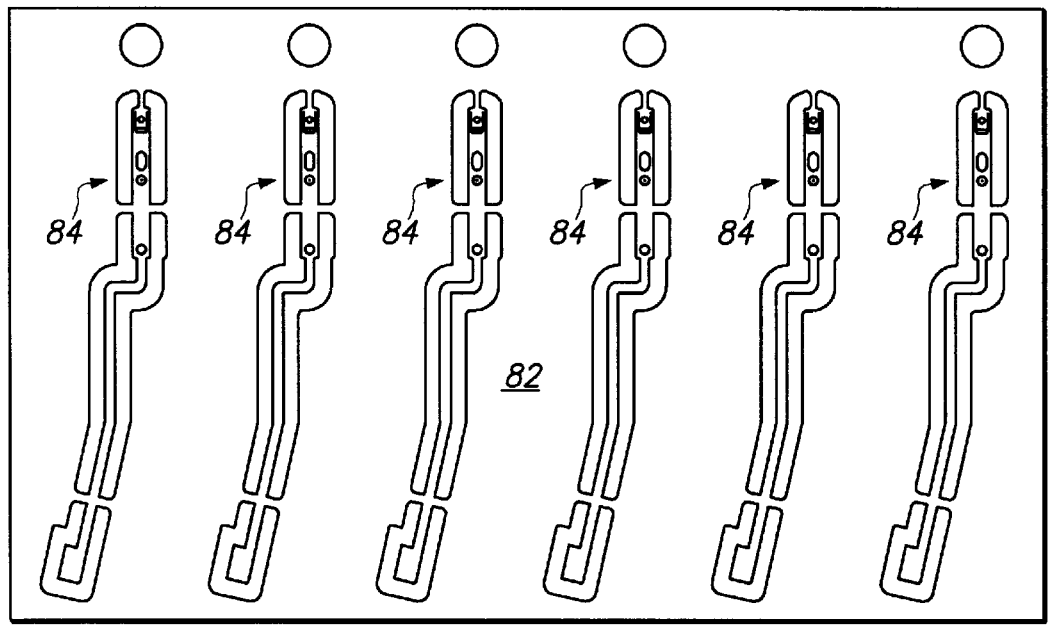
FIG. 12a is a plan view of a sheet of partially formed flex circuit flexures.
Figure 12C:
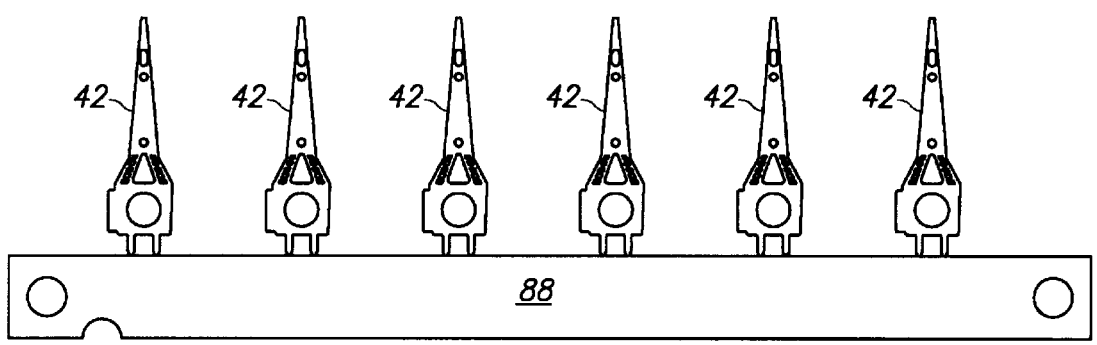
FIG. 12c is a plan view of a set of partially formed suspension structures which include integral load beam structures.
Figure 12B:
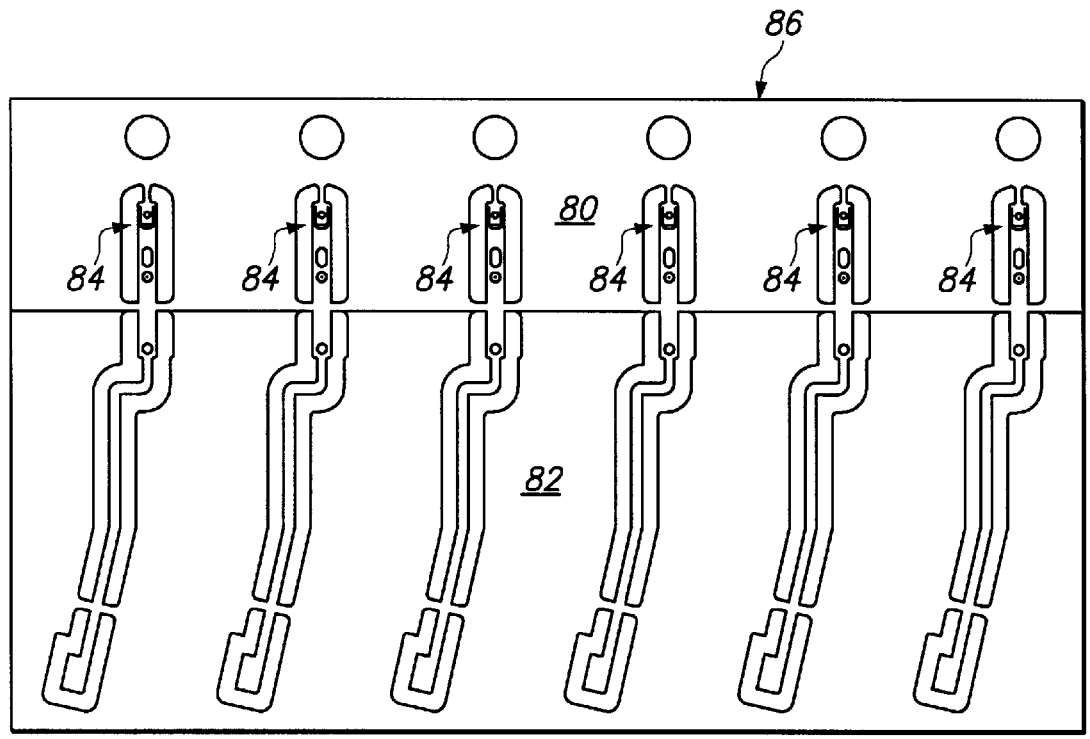

In yet another embodiment of the invention, the flex flexure circuit may be fabricated such that the flexure can be joined to the load beam using industry standard laser welding techniques. With reference to FIGS. 12a, 12b, and 12c, a stainless steel stiffener panel 80 is formed and bonded to a flex circuit sheet 82 (which may include several partially formed flex circuit flexures 84) to form a panel 86 of stiffened flex circuit flexures (i.e., flex circuit flexures that include an integral stainless steel stiffener). A set 88 of suspension load beams 42 may then be registered onto panel 86 such that the load beams overlay the stainless steel stiffener panel, whereupon conventional laser welding techniques may be employed to join the partially formed flexures 84 to the load beams 42. Finally, panel 86 may be trimmed, cut, or etched to complete the fabrication of individual load beam/flexure assemblies.

A picoslider gimbal in accordance with the present invention provides significant compliance improvements relative to prior art picoslider gimbals. Table 1 shows the results of finite element modeling that indicates the respective pitch and roll stiffnesses of a flex circuit picoslider suspension (including wiring) in accordance with the present invention and a commercially available picoslider suspension having a stainless steel flexure (which does not include wiring). Thus Table 1 compares the worst case compliance of a picoslider suspension in accordance with the present invention with the best case compliance of a prior art picoslider suspension.

TABLE 1

| GIMBAL STIFFNESS (FEM DATA) | COMMERCIAL PICO SUSPENSION (PRIOR ART) | FLEX CIRCUIT PICO SUSPENSION |
|---|---|---|
| Pitch Stiffness mN*mm/deg | 2.28 | 0.90 |
| Roll Stiffness mN*mm/deg | 1.54 | 0.32 |

Note that the roll stiffness of the prior art picoslider suspension is worse by a factor of about 4.8, even without factoring in the nontrivial stiffness contributed by the requisite transducer wiring. Because roll stiffness variation is a major contributor to flying height variation in ABS slider systems, the present invention is clearly seen to facilitate the fabrication of compliant HGA's that exhibit significantly reduced flying height variations. It should also be noted that the pitch compliance is improved by a factor of about 2.5.

The present invention also avoids a significant problem inherent in the manufacture of prior art HGA's. Specifically, the loadbeam and flexures of current HGA's are mechanically tuned (i.e., bent) to compensate for wiring bias and other manufacturing and handling effects in order to ensure proper flying height performance. If during assembly of a headstack or of a drive the wires are bumped or moved, however, the wiring bias may change enough to make the head unusable. The present invention avoids this problem eliminating the wires altogether in certain embodiments or by attaching the wires to a portion of the gimbal that is fixed with respect to the head to eliminate wire bias in other embodiments.

The improved robustness of the present invention offers even greater advantages as advanced MR head transducers, which require additional wires, become more widely used. Current HGA's are susceptible to both wire breakage and wire shorting due to the gauge of wires used in such designs and the use of MR heads at least doubles these risks. In addition, the wire bias problem also gets worse when using MR heads.

In summary, the instant invention discloses a flex circuit that provides a low mass suspension or HGA having improved gimbal performance, particular with respect to applications employing ultra low mass sliders with advance dual element heads operating in an in-line rotary actuator assembly. The combination of low overall mass and improved gimbal performance (without attendant reductions in servo capability) provides improved seek performance and reliability relative to a drive which incorporates prior art picoslider HGA designs. To the extent that the flex circuit structure extends along the load beam, it may also act as damping layer which can further improve servo performance. Thus the present invention facilitates the design and fabrication of more reliable and higher performance disk drives.

Although the present invention has been described in terms of the presently preferred embodiment, i.e., a flex circuit having a gimbal optimized for use with picosliders or subpicosliders, it should be clear to those skilled in the art that the present invention may also be applicable to suspensions designed for use with somewhat larger sliders, such as nanosliders. It should therefore be understood that the instant disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An improved HGA, head gimbal assembly, for reading and writing information with respect to a relatively moving disk in a disk drive having a rotary actuator including an actuator arm and having electronic componentry, the HGA comprising:

a baseplate for mounting the HGA to the actuator arm;

a spring section fixed to the baseplate;

a cantilevered conductive load beam having a distal end and a proximal end, the proximal end being fixed to the spring section and the distal end including a load button;

a generally planar nonconductive dielectric film including a main body section, a distal end and a proximal end, the main body section being attached to the load beam, the distal end including a gimbal, and the proximal end including an elongate connector structure for interconnection with the electronic componentry;

conductor structure embedded within the dielectric film, the conductor structure extending from the elongate connector structure through the main body section and having a terminating end at the gimbal;

a generally planar tongue defined within the gimbal, the tongue being pivotably supported by the gimbal, the tongue being formed from the nonconductive dielectric film and the tongue having a wire bonding pad at an end thereof for electrically interconnecting to the terminating end of the embedded conductor structure and the tongue including a ground opening; and a read/write head mounted to the tongue, the read/write head including a transducer electrically connected to the bonding pad for electrically interconnecting the head to the electronic componentry, the load button extending through the ground opening and contacting a top surface of the read/write head to ground the head to the load beam and to apply a load force on the head in the direction of the disk.

2. The HGA of claim 1, wherein the main body section of the dielectric film is attached to the load beam by an intermediate layer of adhesive, thermoplastic bonding film.

3. The HGA of claim 2, wherein the thermoplastic bonding film is a polyester copolymer.

4. The HGA of claim 2, wherein the thermoplastic bonding film is thermosetting phenolic butyral.

5. The HGA of claim 1, wherein the main body section of the dielectric film includes metal bonding pads spot welded to the load beam.

6. The HGA of claim 1, further comprising:

a generally planar stainless steel stiffener, wherein the main body section of the dielectric film is attached to the stiffener and the stiffener is spot welded to the load beam.

7. The HGA of claim 6, wherein the main body section of the dielectric film is attached to the stiffener by a film of thermosetting phenolic butyral.

8. An improved HGA, head gimbal assembly, for reading and writing information with respect to a relatively moving disk in a disk drive having a rotary actuator including an actuator arm and having electronic componentry, the HGA comprising:

a baseplate for mounting the HGA to the actuator arm;

a spring section fixed to the baseplate;

a cantilevered conductive load beam having a distal end and a proximal end, the proximal end being fixed to the spring section;

a generally planar dielectric film including a main body section, a distal end and a proximal end the main body section being attached to the load beam, the distal end including a gimbal and the proximal end including an elongate connector structure for interconnection with the electronic componentry;

conductor structure embedded within the dielectric film, the conductor structure extending from the elongate connector structure through the main body section and having a terminating end at the gimbal;

a generally planar tongue defined within the gimbal, the tongue being pivotably supported by the gimbal being formed from the nonconductive dielectric film and the tongue having a wire bonding pad at an end thereof for electrically interconnecting to the terminating end of the embedded conductor structure and the tongue including a ground opening; and a read/write head mounted to the tongue, the read/write head including load button on a top surface thereof and including a transducer electrically connected to the bonding pad for electrically interconnecting the head to the electronic componentry, the load button extending through the ground opening and contacting the distal end of the load beam to ground the head to the load beam.

9. The HGA of claim 8, further comprising:

a generally planar stainless steel stiffener, wherein the main body section of the dielectric film is attached to the stiffener and the stiffener is spot welded to the load beam.

10. The HGA of claim 9, wherein the main body section of the dielectric film is attached to the stiffener by a film of thermosetting phenolic butyral.

11. The HGA of claim 8, wherein the thermoplastic bonding film is thermosetting phenolic butyral.

* * * * *

UNITED STATES PATENT AND TRADEMARK OFFICE
CERTIFICATE OF CORRECTION

PATENT NO. : 6,313,972 B1
DATED : November 6, 2001
INVENTOR(S) : Williams et al.

It is certified that error appears in the above-identified patent and that said Letters Patent is hereby corrected as shown below:

Column 11,
Line 10, replace "end the" with -- end, the --.
Line 20, replace "gimbal being" with -- gimbal, the tongue being --.

Signed and Sealed this

Twenty-eighth Day of May, 2002

Attest:

JAMES E. ROGAN
Attesting Officer
Director of the United States Patent and Trademark Office